United States Patent
Baltas

(10) Patent No.: US 10,989,143 B2
(45) Date of Patent: *Apr. 27, 2021

(54) GAS TURBINE ENGINE BIFURCATION LOCATED FAN VARIABLE AREA NOZZLE

(71) Applicant: RAYTHEON TECHNOLOGIES CORPORATION, Farmington, CT (US)

(72) Inventor: Constantine Baltas, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 580 days.

This patent is subject to a terminal disclaimer.

(21) Appl. No.: 15/889,304

(22) Filed: Feb. 6, 2018

(65) Prior Publication Data

US 2018/0274483 A1 Sep. 27, 2018

Related U.S. Application Data

(63) Continuation of application No. 13/343,964, filed on Jan. 5, 2012, now Pat. No. 9,885,313, which is a
(Continued)

(51) Int. Cl.
| | |
|---|---|
| *F02K 1/06* | (2006.01) |
| *F02K 1/15* | (2006.01) |
| *F02K 3/06* | (2006.01) |
| *F02K 1/12* | (2006.01) |
| *F02K 3/075* | (2006.01) |
| *F02C 3/107* | (2006.01) |

(52) U.S. Cl.
CPC .............. *F02K 1/15* (2013.01); *F02K 1/06* (2013.01); *F02K 3/06* (2013.01); *F02C 3/107* (2013.01);
(Continued)

(58) Field of Classification Search
CPC . F02K 1/12; F02K 1/1207; F02K 3/06; F02K 3/075; F02K 3/077
See application file for complete search history.

(56) References Cited

U.S. PATENT DOCUMENTS

| | | | |
|---|---|---|---|
| 2,258,792 A | 4/1941 | New | |
| 2,393,713 A | 1/1946 | Shoults | |
(Continued)

FOREIGN PATENT DOCUMENTS

| | | |
|---|---|---|
| EP | 0469825 | 2/1992 |
| EP | 0743434 | 11/1996 |
(Continued)

OTHER PUBLICATIONS

Wes K. Lord, "P&W Expectations for QAT", NASA Quiet Aircraft Technology (QAT) Workshop, Dallas Texas, Apr. 11-12, 2000, pp. 1-7. (Year: 2000).*

(Continued)

*Primary Examiner* — Lorne E Meade

(74) *Attorney, Agent, or Firm* — Carlson, Gaskey & Olds, P.C.

(57) ABSTRACT

A gas turbine engine includes a core engine defined about an axis, a gear system driven by the core engine, and a pylon variable area flow system. A fan is driven by the gear system. The variable area flow system operates to effect the bypass flow.

29 Claims, 2 Drawing Sheets

Related U.S. Application Data continuation-in-part of application No. 12/441,546, filed on Mar. 17, 2009, now Pat. No. 8,418,471.

(52) U.S. Cl.
CPC .............. *F02K 1/12* (2013.01); *F02K 1/1207* (2013.01); *F02K 3/075* (2013.01)

(56) References Cited

U.S. PATENT DOCUMENTS

| | | | |
|---|---|---|---|
| 2,625,009 A | 1/1953 | Leggett et al. | |
| 2,936,655 A | 5/1960 | Peterson et al. | |
| 3,021,731 A | 2/1962 | Stoeckicht | |
| 3,194,487 A | 7/1965 | Tyler et al. | |
| 3,287,906 A | 11/1966 | McCormick | |
| 3,352,178 A | 11/1967 | Lindgren et al. | |
| 3,412,560 A | 11/1968 | Gaubatz | |
| 3,664,612 A | 5/1972 | Skidmore et al. | |
| 3,747,343 A | 7/1973 | Rosen | |
| 3,754,484 A | 8/1973 | Roberts | |
| 3,765,623 A | 10/1973 | Donelson et al. | |
| 3,820,719 A | 6/1974 | Clark | |
| 3,843,277 A | 10/1974 | Ehrich | |
| 3,892,358 A | 7/1975 | Gisslen | |
| 3,932,058 A | 1/1976 | Harner et al. | |
| 3,935,558 A | 1/1976 | Miller et al. | |
| 3,988,889 A | 11/1976 | Chamay et al. | |
| 4,130,872 A | 12/1978 | Harloff | |
| 4,220,171 A | 9/1980 | Ruehr | |
| 4,240,250 A | 12/1980 | Harris | |
| 4,251,987 A | 2/1981 | Adamson | |
| 4,284,174 A | 8/1981 | Salvana et al. | |
| 4,289,360 A | 9/1981 | Zirin | |
| 4,474,001 A | 10/1984 | Griffin et al. | |
| 4,478,551 A | 10/1984 | Honeycutt, Jr. et al. | |
| 4,649,114 A | 3/1987 | Miltenburger et al. | |
| 4,696,156 A | 9/1987 | Burr et al. | |
| 4,722,357 A | 2/1988 | Wynosky | |
| 4,827,712 A | 5/1989 | Coplin | |
| 4,885,912 A | 12/1989 | Nakhamkin | |
| 4,979,362 A | 12/1990 | Vershure, Jr. | |
| 5,058,617 A | 10/1991 | Stockman et al. | |
| 5,102,379 A | 4/1992 | Pagluica et al. | |
| 5,123,242 A | 6/1992 | Miller | |
| 5,141,400 A | 8/1992 | Murphy et al. | |
| 5,203,163 A | 4/1993 | Parsons | |
| 5,275,356 A | 1/1994 | Bollinger et al. | |
| 5,317,877 A | 6/1994 | Stuart | |
| 5,319,927 A | 6/1994 | Maguire | |
| 5,361,580 A | 11/1994 | Ciokajlo et al. | |
| 5,369,954 A | 12/1994 | Stuart | |
| 5,433,674 A | 7/1995 | Sheridan et al. | |
| 5,447,411 A | 9/1995 | Curley et al. | |
| 5,466,198 A | 11/1995 | McKibbin et al. | |
| 5,467,941 A | 11/1995 | Chee | |
| 5,524,847 A | 6/1996 | Brodell et al. | |
| 5,634,767 A | 6/1997 | Dawson | |
| 5,677,060 A | 10/1997 | Terentieva et al. | |
| 5,729,969 A | 3/1998 | Porte | |
| 5,778,659 A | 7/1998 | Duesler et al. | |
| 5,857,836 A | 1/1999 | Stickler et al. | |
| 5,865,398 A | 2/1999 | Pashea et al. | |
| 5,915,917 A | 6/1999 | Eveker et al. | |
| 5,975,841 A | 11/1999 | Lindemuth et al. | |
| 5,985,470 A | 11/1999 | Spitsberg et al. | |
| 6,223,616 B1 | 5/2001 | Sheridan | |
| 6,282,881 B1 * | 9/2001 | Beutin .................. B64D 33/10 184/6.11 | |
| 6,315,815 B1 | 11/2001 | Spadaccini et al. | |
| 6,318,070 B1 | 11/2001 | Rey et al. | |
| 6,387,456 B1 | 5/2002 | Eaton, Jr. et al. | |
| 6,517,341 B1 | 2/2003 | Brun et al. | |
| 6,607,165 B1 | 8/2003 | Manteiga et al. | |
| 6,709,492 B1 | 3/2004 | Spadaccini et al. | |
| 6,751,944 B2 | 6/2004 | Lair | |
| 6,814,541 B2 | 11/2004 | Evans et al. | |
| 6,820,410 B2 | 11/2004 | Lair | |
| 6,883,303 B1 | 4/2005 | Seda | |
| 6,964,155 B2 | 12/2005 | McCune et al. | |
| 6,983,588 B2 | 1/2006 | Lair | |
| 7,021,042 B2 | 4/2006 | Law | |
| 7,219,490 B2 | 1/2007 | Dev | |
| 7,328,580 B2 | 2/2008 | Lee et al. | |
| 7,374,403 B2 | 5/2008 | Decker et al. | |
| 7,451,592 B2 | 11/2008 | Taylor et al. | |
| 7,574,856 B2 | 8/2009 | Mak | |
| 7,591,754 B2 | 9/2009 | Duong et al. | |
| 7,607,308 B2 | 10/2009 | Kraft et al. | |
| 7,632,064 B2 | 12/2009 | Somanath | |
| 7,662,059 B2 | 2/2010 | McCune | |
| 7,765,788 B2 | 8/2010 | Schwarz | |
| 7,806,651 B2 | 10/2010 | Kennepohl et al. | |
| 7,810,312 B2 | 10/2010 | Stretton et al. | |
| 7,824,305 B2 | 11/2010 | Duong et al. | |
| 7,828,682 B2 | 11/2010 | Snook | |
| 7,861,513 B2 | 1/2011 | Stretton | |
| 7,886,520 B2 | 2/2011 | Stretton et al. | |
| 7,926,260 B2 | 4/2011 | Sheridan et al. | |
| 7,997,061 B2 | 8/2011 | Marche | |
| 7,997,082 B2 | 8/2011 | Beardsley | |
| 7,997,868 B1 | 8/2011 | Liang et al. | |
| 8,205,432 B2 | 6/2012 | Sheridan | |
| 8,418,471 B2 * | 4/2013 | Baltas ....................... F02K 1/30 60/772 |
| 9,885,313 B2 * | 2/2018 | Baltas ....................... F02K 1/06 | |
| 2006/0228206 A1 | 10/2006 | Decker et al. | |
| 2007/0245739 A1 | 10/2007 | Stretton | |
| 2008/0003096 A1 | 1/2008 | Kohli et al. | |
| 2008/0028763 A1 | 2/2008 | Schwarz et al. | |
| 2008/0116009 A1 | 5/2008 | Sheridan et al. | |
| 2008/0288387 A1 | 11/2008 | Meyerhoff, II | |
| 2008/0317588 A1 | 12/2008 | Grabowski et al. | |
| 2009/0053058 A1 | 2/2009 | Kohlenberg et al. | |
| 2009/0056343 A1 | 3/2009 | Suciu et al. | |
| 2009/0178416 A1 | 7/2009 | Migliaro et al. | |
| 2009/0304518 A1 | 12/2009 | Kodama et al. | |
| 2009/0314881 A1 | 12/2009 | Suciu et al. | |
| 2010/0105516 A1 | 4/2010 | Sheridan et al. | |
| 2010/0148396 A1 | 6/2010 | Xie et al. | |
| 2010/0212281 A1 | 8/2010 | Sheridan | |
| 2010/0218483 A1 | 9/2010 | Smith | |
| 2010/0331139 A1 | 12/2010 | McCune | |
| 2011/0159797 A1 | 6/2011 | Beltman et al. | |
| 2011/0173990 A1 | 7/2011 | Thies | |
| 2011/0293423 A1 | 12/2011 | Bunker et al. | |
| 2012/0124964 A1 | 5/2012 | Hasel et al. | |

FOREIGN PATENT DOCUMENTS

| | | |
|---|---|---|
| EP | 0791383 | 8/1997 |
| EP | 1142850 | 10/2001 |
| EP | 1936172 | 6/2008 |
| EP | 1956224 | 8/2008 |
| FR | 2889254 | 2/2007 |
| FR | 2891313 | 3/2007 |
| GB | 1516041 | 6/1978 |
| GB | 2041090 | 9/1980 |
| GB | 2426792 | 12/2006 |
| GB | 2437377 | 10/2007 |
| WO | 03099654 | 12/2003 |
| WO | 2007038674 | 4/2007 |
| WO | 2008045034 | 4/2008 |
| WO | 2008045062 | 4/2008 |
| WO | 2008045074 | 4/2008 |
| WO | 2008045093 | 4/2008 |

OTHER PUBLICATIONS

Jane's Aero-Engines, Issue Seven, Edited by Bill Gunston, Jane's Information Group Inc., Alexandria, Virginia, 2000, pp. 1-47 and 510-512. (Year: 2000).*

Lord, Wes et al., "Flow Control Opportunities in Gas Turbine Engines", AIAA-2000-2234, Fluids 2000, Denver, Colorado, Jun. 19-22, 2000, pp. 1-16. (Year: 2000).*

(56) References Cited

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-151.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-99, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

European Search Report for European Patent Application No. 15169575.6 completed Aug. 31, 2015.

Warwick, G. (2007). Civil engines: Pratt & Whitney gears up for the future with GTF. Flight International, Nov. 2007. Retrieved Jun. 14, 2016 from: https://www.flightglobal.com/news/articles/civil-engines-pratt-/amp-whitney-gears-up-for-the-future-with-219989/.

Coy, Peter. The little gear that could reshape the jet engine: A simple idea's almost 30-year, $10 billion journey oto the aircraft mainstream. Bloomberg Business. Oct. 15, 2015. p. 1-4.

Read, B. (2014). Powerplant revolution. AeroSpace. May 2014. pp. 28-31.

Kjelgaard, C. (2010). Gear up for the GTF. Aircraft Technology, 105. Apr.-May 2010. pp. 86, 88, 90, 92-95.

(56) References Cited

OTHER PUBLICATIONS

Lord, W.K. (2000). P&W expectations. Quiet Aircraft Technology Workshop, Dallas, TX Apr. 11-12, 2000. pp. 1-7.
Singapore Search Report and Written Opinion for Singapore Application No. 11201402896P completed Mar. 13, 2015.
European Search Report for European Patent Application No. 13749845.7 completed Aug. 5, 2015.
Huff, D. (2006). Technologies for aircraft noise reduction. NASA Glenn Research Center. West Park Airport Committee Meeting. Feb. 16, 2006. pp. 1-23.
Penner, J. E., Lister, D. H., Griggs, D. J., Doken, D. J., and McFarland, M. (Eds). (1999). Aviation and the global atmosphere. Cambridge University Press, UK, 1999. pp. 373.
Boggia, S. and Rud, K.. (2005). Intercooled recuperated gas turbine engine concept. 41st AIAA/ASME/SAE/ASEE Joint Propulsion Conference & Exhibit. Tuscon, Arizona. Jul. 10-13. 2005. pp. 1-11.
Search Report and Written Opinion for PCT Application No. PCT/US2006/040251, dated Nov. 28, 2007.
International Preliminary Report on Patentability dated Jan. 27, 2009 for PCT/US2006/040251.
International Search Report and Written Opinion for International Application No. PCT/US2013/020077 completed on Sep. 10, 2013.
Engber, M., Klaus, R., Ardey, S., Gier, J., and Waschka, W. (2007). Advanced technologies for next generation regional jets—Survey of research activities at MTU Aero Engines. Proceedings: XVIII International Symposium on Air Breathing Engines (ISABE). 18th ISABE Conference. Beijing, China. Sep. 2-7, 2007. pp. 1-11.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L, Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 3-12, 2009, Orlando, Florida, USA. pp. 8-12.
Han, J., Dutta, S., and Ekkad, S.V. (2000). Gas turbine heat transfer and cooling technology. New York, NY: Taylor & Francis. pp. 1-25, 129-157, and 160-249.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-280, 303-309, 323-326, 462-479, 517-520, 563-565, 673-675, 682-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30. pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E. (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 2007. p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003 . . . p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-367-C9-373.
Krenkel, W., Naslain, R., and Schneider, H. Eds. (2001). High temperature ceramic matrix composites pp. 224-229. Weinheim, DE: Wiley-VCH Verlag GmbH.
Cabala, R., Ghosh, Ax., Van Aken, D.C., Srolovitz, D.J., Basu, A., Chang, H., . . . Yang, W. (1992). Mechanical behavior and interface design of MoSi2-based alloys and composites. Materials Science and Engineering, A55, 1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28(9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Jacobson, N.S. (1993). Corrosion of silicon-based ceramics in combustion environments. J. Am. Ceram. Soc. 76(1). pp. 3-28.
Jorgensen, P.J., Wadsworth, M.E., and Cutler, I.B. (1961). Effects of water vapor on oxidation of silicon carbide. J. Am. Ceram. Soc. 44(6). pp. 248-261.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Sundaram, S.K., Hsu, J-Y., Speyer, R.F. (1995). Molten glass corrosion resistance of immersed combustion—heating tube materials in e-glass. J. Am. Ceram. Soc. 78(7). pp. 1940-1946.
Jeng, Y.-L., Lavernia, E.J. (1994). Processing of molybdenum disilicide. J. of Mat. Sci. vol. 29. 1994. pp. 2557-2571.

(56) References Cited

OTHER PUBLICATIONS

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.
Sundaram, S.K., Hsu, J-Y., Speyer, R.F. (1994). Molten glass corrosion resistance of immersed combustion—heating tube materials in soda-lime-silicate glass. J. Am. Ceram. Soc. 77(6). pp. 1613-1623.
Leckie, F.A. and Dal Bello, D.J. (2009). Strength and stiffness of engineering systems. Mechanical Engineering Series. Springer. pp. 1-3.
El-Sayad, A.F. (2008). Aircraft propulsion and gas turbine engines. Boca Raton, FL: CRC Press. pp. 215-219 and 855-860.
Bunker, R.S. (2005). A review of shaped hole turbine film-cooling technology. Journal of Heat Transfer vol. 127. Apr. 2005. pp. 441-453.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-31.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-151.
Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, L., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.N. and Schairer, E.T. (1977). Analysis of turbofan propulsion system weight and dimensions. NASA Technical Memorandum. Jan. 1977. pp. 1-65.
Meyer, A.G. (1988). Transmission development of Textron Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Gates, D. Bombardier flies at higher market. Seattle Times. Jul. 13, 2008. pp. C6.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Trembley, JR., H.F. (1977). Determination of effects of ambient conditions on aircraft engine emissions. ALF 502 combustor rig testing and engine verification test. Prepared for Environmental Protection Agency. Sep. 1977. pp. 1-256.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
McCune, M.E. (1993). Initial test results of 40,000 horsepower fan drive gear system for advanced ducted propulsion systems. AIAA 29th Joint Conference and Exhibit. Jun. 28-30, 1993. pp. 1-10.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

(56) References Cited

OTHER PUBLICATIONS

Drago, R.J. (1974). Heavy-lift helicopter brings up drive ideas. Power Transmission Design. Mar. 1987. pp. 1-15.
Krantz, T.L. (1990). Experimental and analytical evaluation of efficiency of helicopter planetary stage. NASA Technical Paper. Nov. 1990. pp. 1-19.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Thulin, R.D., Howe, D.C., and Singer, I.D. (1982). Energy efficient engine: High pressure turbine detailed design report. Prepared for NASA/ NASA CR-165608. pp. 1-178.
Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Gray, D.E. (1978). Energy efficient engine preliminary design and integration studies. Prepared for NASA. NASA CR-135396. Nov. 1978. pp. 1-366.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retreived from https://geaviation.com/sites/default/files/datasheet-CF6-80C2.pdf.
Salemme, C.T. and Murphy, G.C. (1979). Metal sparlsuperhybrid shell composite fan blades. Prepared for NASA. NASA-CR-159594. Aug. 1979. pp. 1-127.
"Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".
Datasheet. Genx™ high bypass turbofan engines. Retreived from: https://www.geaviation.com/sites/default/files/datasheet-genx.pdf.
Winn, A. (Ed). (1990). Wide Chord Fan Club. Flight International, 4217(137). May 23-29, 1990. pp. 34-38.
Parker, R.G. and Lin, J. (2001). Modeling, modal properties, and mesh stiffness variation instabilities of planetary gears. Prepared for NASA. NASA/CR-2001-210939. May 2001. pp. 1-111.
Mancuso, J.R. and Corcoran, J.P. (2003). What are the differences in high performance flexible couplings for turbomachinery? Proceedings of the Thirty-Second Turbomachinery Symposium. 2003. pp. 189-207.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Product Brochure. Garrett TFE731. Allied Signal. Copyright 1987. pp. 1-24.
Honeywell Learjet 31 and 35/36 TFE731-2 to 2C Engine Upgrade Program. Sep. 2005. pp. 1-4.
Honeywell Sabreliner 65 TFE731-3 to -3D Engine Upgrade Program. Oct. 2005. pp. 1-4.
U.S. Department of Transportation: Federal Aviation Administration Type Certificate Data Sheet No. E6WE. Dated: May 9, 2000. p. 1-9.
Kurzke, J. (2012). GasTurb 12: Design and off-design performance of gas turbines. Retrieved from: https://www.scribd.com/document/153900429/GasTurb-12.
Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
About GasTurb. Retrieved Jun. 26, 2018 from: http://gasturb.de/about-gasturb.html.
Kurzke, J. (2001). GasTurb 9: A program to calculate design and off-design performance of gas turbines. Retrieved from: https://www.scribd.com/document/92384867/GasTurb9Manual.
Tummers, B. (2006). DataThief III. Retreived from: https://datathief.org/DatathiefManual.pdf pp. 1-52.
Manual. Student's Guide to Learning SolidWorks Software. Dassault Systemes—SolidWorks Corporation. pp. 1-156.
MacIsaac, B. and Langston, R. (2011). Gas turbine propulsion systems. Chichester, West Sussex: John Wiley & Sons, Ltd. pp. 260-265.
Datasheet. CFM56-5B for the Airbus A320ceo family and CFM56-7B for the Boeing 737 family. https://www.cfmaeroengines.com/.
Turner, M. G., Norris, A., and Veres, J.P. (2004). High-fidelity three-dimensional simulation of the GE90. NASA/TM-2004-212981. pp. 1-18.
Defeo, A. and Kulina, M. (1977). Quiet clean short-haul experimental engine (QCSEE) main reduction gears detailed design final report. Prepared for NASA. NASA-CR-134872. Jul. 1977. pp. 1-221.
Amezketa, M., Iriarte, X., Ros, J., and Pintor, J. (2009). Dynamic model of a helical gear pair with backlash and angle0varying mesh stiffness. Multibody Dynamics 2009, Eccomas Thematic Conference. 2009. pp. 1-36.
Singh, A. (2005). Application of a system level model to study the planetary load sharing behavior. Jounal of Mechanical Design. vol. 127. May 2005. pp. 469-476.
Smith-Boyd, L. and Pike, J. (1986). Expansion of epicyclic gear dynamic analysis program. Prepared for NASA. NASA CR-179563. Aug. 1986. pp. 1-98.
Wikipedia. Torsion spring. Retreived Jun. 29, 2018 from: https://en.wikipedia.org/wiki/Torsion_spring.
AGMA Standard (2006). Design manual for enclosed epicyclic gear drives. Alexandria, VA: American Gear Manufacturers Association. pp. 1-104.
AGMA Standard (1997). Design and selection of components for enclosed gear drives. lexandria, VA: American Gear Manufacturers Association. pp. 1-48.
Daly, M. Ed. (2007). Jane's Aero-Engine. Issue Twenty-three. Mar. 2008. p. 707-12.
AGMA Standard (1999). Flexible couplings—Mass elastic properties and other characteristics. Alexandria, VA: American Gear Manufacturers Association. pp. 1-46.
Wikipedia. Stiffness. Retrieved Jun. 28, 2018 from: https://en.wikipedia.orgiwiki/Stiffness.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Hill, P.G., Peterson, C.R. (1965). Mechanics and thermodynamics of propulsion. Addison-Wesley Publishing Company, Inc. pp. 307-308.
Hill, P.G., Peterson, C.R. (1992). Mechanics and thermodynamics of propulsion, 2nd Edition. Addison-Wesley Publishing Company, Inc. pp. 400-406.

(56) References Cited

OTHER PUBLICATIONS

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.

Gray, D.E. and Gardner, W.B. (1983). Energy efficient engine program technology benefit/cost study—vol. 2. NASA CR-174766. Oct. 1983. pp. 1-118.

Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.

Groweneweg, J.F. (1994). Fan noise research at NASA. Noise—CON 94. Fort Lauderdale, FL. May 1-4, 1994. pp. 1-10.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. AIAA-93/0598. 31st Aerospace Sciences Meeting. Reno, Nv. Jan. 11-14, 1993. pp. 1-30.

Howe, D.C., and Wynosky, T.A. (1985). Energy efficient engine program advanced turbofan nacelle definition study. NASA-CR-174942. May 1985. pp. 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.

Johnston, R.P. and Hemsworth, M.G. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Munt, R. (1981). Aircraft technology assessment: Progress in low emissions engine. Technical Report. May 1981. pp. 1-171.

Avco Lycoming Divison. ALF 502L Maintenance Manual. Apr. 1981. pp. 1-118.

Type Certificate Data Sheet No. E6NE. Department of Transportation Federal Aviation Administration. Jun. 7, 2002. pp. 1-10.

Trembley, Jr., H.F. (1977). Determination of effects of ambient conditions on aircraft engine emissions. Prepared for Environmental Protection Agency. Ann Arbor, Michigan. Sep. 1977 pp. 1-256.

Honeywell LF502. Jane's Aero-engines, Aero-engines—Turbofan. Aug. 17, 2016.

Rauch, D. (1972). Design study of an air pump and integral lift engine ALF-504 using the Lycoming 502 core. Prepare for NASA. Jul. 1972. pp. 1-182.

Dassault Falcon 900EX Easy Systems Summary. Retrieved from: http://www.smartcockpit.com/docs/F900EX-Engines.pdf pp. 1-31.

Honeywell TFE731 Pilot Tips. pp. 1-143.

Honeywell TFE731-5AR to -5BR Engine Conversion Program. Sep. 2005. pp. 1-4.

Garret TFE731 Turbofan Engine (CAT C). Chapter 79: Lubrciation System. TTFE731 Issue 2. 2010. pp. 1-24.

McArdle, J.G. (1979). Static test-stand performance of the YF-102 turbofan engine with several exhaust configurations for the quiet short-haul research aircraft (QSRA). NASA Technical Paper. Nov. 1979. pp. 1-68.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp.1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Kandebo, S.M. (1998). Geared-Turbofan engine design targets cost, complexity. Aviation Week & Space Technology, 148(8). p. 34-5.

Davis, D.G.M. (1973). Variable-pitch fans: Progress in Britain. Flight International. Apr. 19, 1973. pp. 615-617.

Levintan, R.M. (1975). Q-Fan demonstrator engine. Journal of Aircraft. vol. 12( 8). Aug. 1975. pp. 658-663.

Technical Report. (1975). Quiet Clean Short-haul Experimental Engine (QCSEE) UTW fan preliminary design. NASA-CR-134842. Feb. 1, 1975. pp. 1-98.

Aerospace Information Report. (2008). Advanced ducted propulsor in-flight thrust determination. SAE International AIR5450. Aug. 2008. p. 1-392.

Daggett, D.L., Brown, S.T., and Kawai, R.T. (2003). Ultra-efficient engine diameter study. NASA/CR-2003-212309. May 2003. pp. 1-52.

* cited by examiner

GAS TURBINE ENGINE BIFURCATION LOCATED FAN VARIABLE AREA NOZZLE

REFERENCE TO RELATED APPLICATIONS

This application is a continuation of U.S. patent application Ser. No. 13/343,964, filed Jan. 5, 2012, which is a continuation in part of U.S. patent application Ser. No. 12/441,546, filed Mar. 17, 2009.

BACKGROUND OF THE INVENTION

The present invention relates to a gas turbine engine, and more particularly to a turbofan engine having a bifurcation which effectively varies a fan nozzle exit area by adjusting a variable area flow system within the bifurcation to selectively vary the bypass area through which bypass flow may pass.

Conventional gas turbine engines include a fan section and a core engine with the fan section having a larger diameter than that of the core engine. The fan section and the core engine are disposed in series along a longitudinal axis and are enclosed in a nacelle. An annular stream of primary airflow passes through a radially inner portion of the fan section and through the core engine to generate primary thrust.

Combustion gases are discharged from the core engine through a primary airflow path and are exhausted through a core exhaust nozzle. An annular fan flow path, disposed radially outwardly of the primary airflow path, passes through a radial outer portion between a fan nacelle and a core nacelle and is discharged through an annular fan exhaust nozzle defined at least partially by the fan nacelle and the core nacelle to generate fan thrust. A majority of propulsion thrust is provided by the pressurized fan air discharged through the fan exhaust nozzle, the remaining thrust provided from the combustion gases discharged through the core exhaust nozzle.

The fan nozzles of conventional gas turbine engines have a fixed geometry. The fixed geometry fan nozzles are a compromise suitable for take-off and landing conditions as well as for cruise conditions. Some gas turbine engines have implemented fan variable area nozzles. The fan variable area nozzle provide a smaller fan exit nozzle diameter during cruise conditions and a larger fan exit nozzle diameter during take-off and landing conditions. Existing fan variable area nozzles typically utilize relatively complex mechanisms that increase overall engine weight to the extent that the increased fuel efficiency typically associated with the use of a fan variable area nozzle may be negated.

SUMMARY OF THE INVENTION

A gas turbine engine according to an exemplary aspect of the present disclosure may include a core engine defined about an axis, a gear system driven by the core engine, the gear system defines a gear reduction ratio of greater than or equal to about 2.3, a fan driven by the gear system about the axis to generate a bypass flow, and a variable area flow system which operates to effect the bypass flow.

In a further non-limiting embodiment of any of the foregoing gas turbine engine embodiments, the variable area flow system may include an annular fan variable area nozzle (FVAN).

In a further non-limiting embodiment of any of the foregoing gas turbine engine embodiments, the gas turbine engine may include a gear system driven by the core engine to drive the fan. The gear system may define a gear reduction ratio of greater than or equal to about 2.5.

In a further non-limiting embodiment of any of the foregoing gas turbine engine embodiments, the gas turbine engine may include a gear system driven by the core engine to drive the fan. The gear system may define a gear reduction ratio of greater than or equal to 2.5.

In a further non-limiting embodiment of any of the foregoing gas turbine engine embodiments, the core engine may include a low pressure turbine which defines a pressure ratio that is greater than about five (5).

In a further non-limiting embodiment of any of the foregoing gas turbine engine embodiments, the core engine may include a low pressure turbine which defines a pressure ratio that is greater than five (5).

In a further non-limiting embodiment of any of the foregoing gas turbine engine embodiments, the bypass flow may define a bypass ratio greater than about six (6).

In a further non-limiting embodiment of any of the foregoing gas turbine engine embodiments, the bypass flow may define a bypass ratio greater than about ten (10).

In a further non-limiting embodiment of any of the foregoing gas turbine engine embodiments, the bypass flow may define a bypass ratio greater than ten (10).

In a further non-limiting embodiment of any of the foregoing gas turbine engine embodiments, the variable area flow system may operate to change a pressure ratio of the bypass flow.

In a further non-limiting embodiment of any of the foregoing gas turbine engine embodiments, the variable area flow system may operate to vary an area of a fan nozzle exit area for the bypass flow.

In a further non-limiting embodiment of any of the foregoing gas turbine engine embodiments, the fan may be defined for a predefined flight condition. Additionally or alternatively, the predefined flight condition may be about 0.8 MACH and about 35,000 feet. Additionally or alternatively, the predefined flight condition may be 0.8 MACH and 35,000 feet.

In a further non-limiting embodiment of any of the foregoing gas turbine engine embodiments, the fan may include fan blades designed at a particular fixed stagger angle related to the flight condition.

In a further non-limiting embodiment of any of the foregoing gas turbine engine embodiments, the variable area flow system may operate to adjust the bypass flow such that an angle of attack of the fan blades are maintained close to a design incidence at flight conditions other than the predefined flight condition.

A gas turbine engine according to another exemplary aspect of the present disclosure may include a core engine defined about an axis. The core engine may include a low pressure turbine which defines a pressure ratio that is greater than about five (5), a fan driven by the core engine about the axis to generate a bypass flow, and a variable area flow system which operates to effect the bypass flow.

In a further non-limiting embodiment of any of the foregoing gas turbine engine embodiments, the variable area flow system may include an annular fan variable area nozzle (FVAN).

In a further non-limiting embodiment of any of the foregoing gas turbine engine embodiments, the core engine may include a low pressure turbine which defines a pressure ratio that is greater than five (5).

In a further non-limiting embodiment of any of the foregoing gas turbine engine embodiments, the gas turbine engine may include a gear system driven by the core engine to drive the fan. The gear system may define a gear reduction ratio of greater than or equal to about 2.5.

In a further non-limiting embodiment of any of the foregoing gas turbine engine embodiments, the bypass flow may define a bypass ratio greater than about six (6). Additionally or alternatively, the bypass flow may define a bypass ratio greater than about ten (10). Additionally or alternative, the bypass flow may define a bypass ratio greater than ten (10).

In a further non-limiting embodiment of any of the foregoing gas turbine engine embodiments, the variable area flow system may operate to change a pressure ratio of the bypass flow. Additionally or alternatively, the variable area flow system may operate to vary an area of a fan nozzle exit area for the bypass flow.

In a further non-limiting embodiment of any of the foregoing gas turbine engine embodiments, the fan may be defined for a predefined flight condition. Additionally or alternatively, the flight condition may be about 0.8 MACH and about 35,000 feet.

In a further non-limiting embodiment of any of the foregoing gas turbine engine embodiments, the fan may include fan blades designed at a particular fixed stagger angle related to the predefined flight condition.

In a further non-limiting embodiment of any of the foregoing gas turbine engine embodiments, the variable area flow system may operate to adjust the bypass flow such that an angle of attack of the fan blades are maintained close to a design incidence at flight conditions other than the predefined flight condition.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
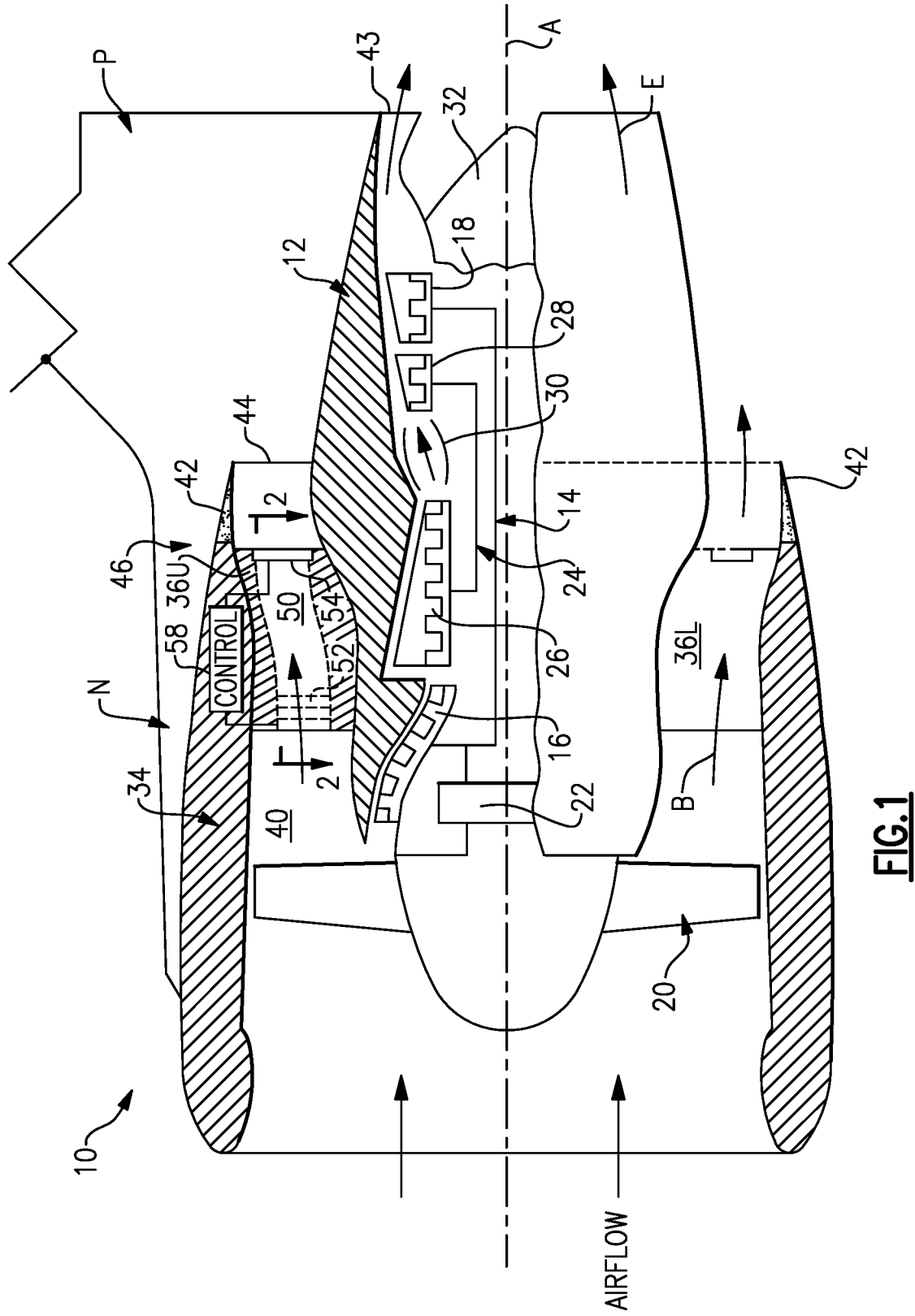
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N as is typical of an aircraft designed for subsonic operation.

The turbofan engine 10 includes a core engine within a core nacelle 12 that houses a low spool 14 and high spool 24. The low spool 14 includes a low pressure compressor 16 and low pressure turbine 18. The low spool 14 drives a fan section 20 connected to the low spool 14 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 is preferably a high-bypass geared turbofan aircraft engine. In one disclosed, non-limiting embodiment, the engine 10 bypass ratio is greater than about six (6) to ten (10), the gear train 22 is an epicyclic gear train such as a planetary gear system or other gear system with a gear reduction ratio of greater than about 2.3 and the low pressure turbine 18 has a pressure ratio that is greater than about 5. Preferably, the engine 10 bypass ratio is greater than ten (10), the fan diameter is significantly larger than that of the low pressure compressor 16, and the low pressure turbine 18 has a pressure ratio that is greater than 5. The gear train 22 is preferably an epicyclic gear train such as a planetary gear system or other gear system with a gear reduction ratio of greater than 2.5. It should be understood, however, that the above parameters are only exemplary of various preferred geared turbofan engines and that the present invention is likewise applicable to other gas turbine engines.

Airflow enters a fan nacelle 34 which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through the gear train 22. A core engine exhaust E exits the core nacelle 12 through a core nozzle 43 defined between the core nacelle 12 and a tail cone 32.

The core nacelle 12 is supported within the fan nacelle 34 by a pylon structure often generically referred to as an upper bifurcation 36U and lower bifurcation 36L, however, other types of pylons and supports at various radial locations may likewise be usable with the present invention.

A bypass flow path 40 is defined between the core nacelle 12 and the fan nacelle 34. The engine 10 generates a high bypass flow arrangement with a bypass ratio in which approximately 80 percent of the airflow entering the fan nacelle 34 becomes bypass flow B. The bypass flow B communicates through the generally annular (circumferentially broken only by the bifurcations 36U, 36L) bypass flow path 40 and is discharged from the engine 10 through an annular fan variable area nozzle (FVAN) 42 which defines a variable fan nozzle exit area 44 between the fan nacelle 34 and the core nacelle 12. The upper bifurcation 36U and the lower bifurcation 36L, although aerodynamically optimized (best seen in FIG. 2), occupies some portion of the volume between the core nacelle 12 and the fan nacelle 34.

Thrust is a function of density, velocity, and area. One or more of these parameters can be manipulated to vary the amount and direction of thrust provided by the bypass flow B. The upper bifurcation 36U preferably includes a pylon variable area flow system 50 having a passage 56 defined between a pylon intake 52 and a pylon exhaust 54 to selectively vary the FVAN 42 area through which bypass flow B may pass. Preferably, both the pylon intake 52 and the pylon exhaust 54 are variable and controlled in response to a controller 58. It should be understood that although the upper bifurcation 36U is illustrated in the disclosed embodiment as having the pylon variable area flow passage 50, the lower bifurcation as well as other pylon structures may likewise include such variable area flow systems.

Figure 2:
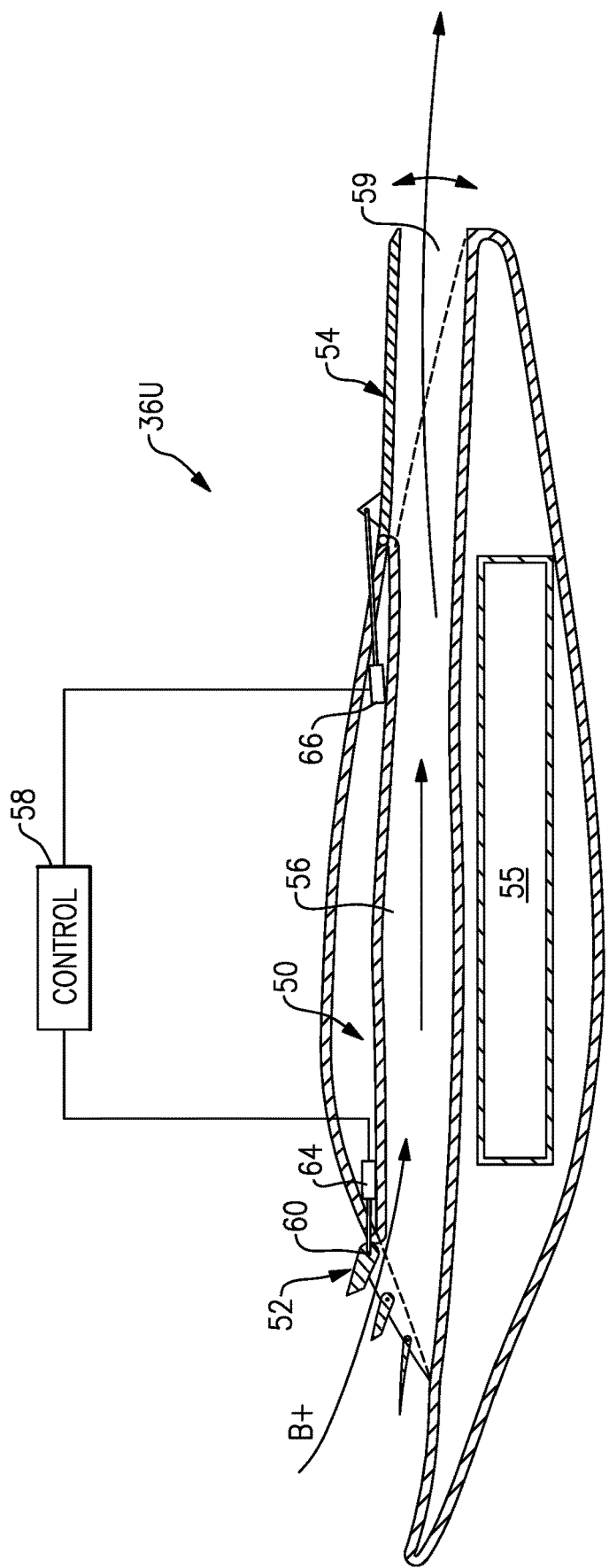
FIG. 2 is a sectional view through an engine pylon of the engine of FIG. 1 at line 2-2 to illustrate a variable area flow system.

Referring to FIG. 2, the pylon variable area flow system 50 changes the pressure ratio of the bypass flow B. That is, the nozzle exit area 44 is effectively varied in area by opening and closing the additional flow area of the pylon variable area flow system 50 to vary the bypass flow B. It should be understood that various actuators 64, 66 in communication with the controller 58 may be utilized to operate the pylon intake 52 and the pylon exhaust 54 in response to predetermined flight conditions. It should be understood that either of the pylon intake 52 and the pylon exhaust 54 may be fixed but it is preferred that both are adjustable in response to the controller 58 to control the flow area through the flow passage 56.

The flow passage 56 is defined around a component duct 55 within the upper bifurcation 36U which provides a communication path for wiring harnesses, fluid flow conduits and other components to the core nacelle 12 from, for example, the aircraft wing. It should be understood that various flow passage 56 paths will likewise be usable with the present invention.

The pylon intake 52 preferably includes an adjustable intake such as a louver system 60 with empirically-designed turning vanes which most preferably have a variation of height to minimize the "shadowing" effect created by each upstream louver relative the next downstream louver.

The pylon exhaust 54 preferably includes a variable nozzle 59. The variable nozzle 59 may include doors, flaps, sleeves or other movable structure which control the volume of additional fan bypass flow B+ through the FVAN 42.

The pylon variable area flow system 50 changes the physical area through which the bypass flow B may pass. A significant amount of thrust is provided by the bypass flow B due to the high bypass ratio. The fan section 20 of the engine 10 is preferably designed for a particular flight condition—typically cruise at about 0.8 MACH and about 35,000 feet. It should be understood that other arrangements as well as essentially infinite intermediate positions are likewise usable with the present invention.

In operation, the pylon variable area flow system 50 communicates with the controller 58 to effectively vary the area of the fan nozzle exit area 44 through independent or coordinated operation of the pylon intake 52 and the pylon exhaust 54. Other control systems including an engine controller, a flight control computer or the like may also be usable with the present invention. As the fan blades of fan section 20 are efficiently designed at a particular fixed stagger angle for the cruise condition, the pylon variable area flow system 50 is operated to vary the area of the fan nozzle exit area 44 to adjust fan bypass air flow such that the angle of attack or incidence of the fan blades are maintained close to the design incidence at other flight conditions, such as landing and takeoff as well as to meet other operational parameters such as noise level. Preferably, the pylon variable area flow system 50 is closed to define a nominal cruise position fan nozzle exit area 44 and is opened for other flight conditions. The pylon variable area flow system 50 preferably provides an approximately 20% (twenty percent) effective area change in the fan nozzle exit area 44.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
a core engine defined about an axis;
an epicyclic gear system driven by said core engine;
a fan driven by said gear system;
a fan nacelle that at least partially surrounds a core nacelle to define a variable fan nozzle exit area for bypass flow;
at least one bifurcation extending between said fan nacelle and said core nacelle in a radial direction and extending between a leading edge and a trailing edge in an axial direction with respect to said axis, wherein said at least one bifurcation includes a fore end face at said leading edge that directly faces said fan and an aft end face at said trailing edge that faces opposite said fore end face; and
a pylon variable area flow system which operates to effect said bypass flow, wherein said pylon variable area flow system has an internal flow passage defined within said at least one bifurcation between a pylon intake open to said leading edge at said fore end face and a pylon exhaust open to said trailing edge at said aft end face.

2. The engine as recited in claim 1, wherein said pylon variable area flow system operates to vary an area of said variable fan nozzle exit area for said bypass flow.

3. The engine as recited in claim 2, wherein said pylon variable area flow system operates to change a pressure ratio of said bypass flow.

4. The engine as recited in claim 3, wherein said internal flow passage is defined within said at least one bifurcation to extend between said pylon intake and said pylon exhaust such that upstream bypass flow enters said pylon intake, flows through said at least one bifurcation from said leading edge to said trailing edge via said internal flow passage, and exits back into said bypass flow downstream of said at least one bifurcation.

5. The engine as recited in claim 4, wherein said fan is configured for a predefined flight condition.

6. The engine as recited in claim 5, wherein said fan includes fan blades designed at a particular fixed stagger angle related to said predefined flight condition.

7. The engine as recited in claim 6, wherein said pylon variable area flow system operates to adjust said bypass flow such that an angle of attack of said fan blades is maintained close to a design incidence at flight conditions other than said predefined flight condition.

8. The engine as recited in claim 7, wherein said predefined flight condition is 0.8 MACH and 35,000 feet.

9. The engine as recited in claim 6, further comprising an annular fan variable area nozzle located at a downstream end of said fan nacelle which defines said fan nozzle exit area.

10. The engine as recited in claim 9, wherein at least one of said pylon intake and said pylon exhaust are selectively variable.

11. The engine as recited in claim 10, wherein said pylon intake comprises an adjustable intake that includes a plurality of turning vanes located at said leading edge.

12. The engine as recited in claim 11, wherein said pylon exhaust comprises an adjustable exhaust that includes a variable nozzle at said trailing edge.

13. The engine as recited in claim 12, further comprising a controller coupled to a plurality of actuators that operate said adjustable intake and said adjustable exhaust in response to said flight conditions.

14. The engine as recited in claim 13, wherein said at least one bifurcation includes an upper bifurcation.

15. The engine as recited in claim 14, wherein said adjustable intake is a louvered system, and said plurality of turning vanes have a variation of height.

16. The engine as recited in claim 15, wherein said core engine includes a low pressure turbine that drives said fan through said gear system.

17. The engine as recited in claim 16, wherein said flow passage is defined around a component duct within said at least one bifurcation that provides a communication path to said core nacelle from an aircraft wing for at least one of a wiring harness, fluid flow conduit, or other aircraft component.

18. A gas turbine engine comprising:
a core engine defined about an axis, said core engine including a core nacelle;
a fan driven by said core engine;
a fan nacelle radially outward of said core nacelle to define a variable fan nozzle exit area for bypass flow;
at least one bifurcation extending between said fan nacelle and said core nacelle in a radial direction and extending between a leading edge and a trailing edge in an axial direction with respect to said axis, wherein said at least one bifurcation includes a fore end face at said leading edge that directly faces said fan and an aft end face at said trailing edge that faces opposite said fore end face;
a pylon variable area flow system which operates to effect said bypass flow, wherein said pylon variable area flow system has a flow passage defined within said at least one bifurcation between a pylon intake open to said leading edge at said fore end face and a pylon exhaust open to said trailing edge at said aft end face, and wherein at least one of said pylon intake and said pylon exhaust are selectively variable; and
a controller coupled to a plurality of actuators that operate said pylon intake and said pylon exhaust in response to said controller to cause said pylon variable area flow system to selectively vary said variable fan nozzle exit area.

19. The engine as recited in claim 18, further comprising an annular fan variable area nozzle at a downstream end of said fan nacelle that defines said variable fan nozzle exit area, and wherein said flow passage is defined within said at least one bifurcation such that upstream bypass flow enters said pylon intake, flows through said at least one bifurcation from said leading edge to said trailing edge via said flow passage, and exits back into said bypass flow downstream of said at least one bifurcation.

20. The engine as recited in claim 19, further comprising an epicyclic gear system driven by said core engine to drive said fan.

21. The engine as recited in claim 20, wherein said pylon variable area flow system operates to change a pressure ratio of said bypass flow.

22. The engine as recited in claim 21, wherein said fan is configured for a predefined flight condition, and said fan includes fan blades designed at a particular fixed stagger angle related to said predefined flight condition.

23. The engine as recited in claim 22, wherein said predefined flight condition is 0.8 MACH and 35,000 feet.

24. The engine as recited in claim 23, wherein said pylon variable area flow system operates to adjust said bypass flow such that an angle of attack of said fan blades is maintained close to a design incidence at flight conditions other than said predefined flight condition.

25. The engine as recited in claim 23, wherein said pylon intake is an adjustable intake including a plurality of turning vanes at said leading edge.

26. The engine as recited in claim 25, wherein said pylon exhaust is an adjustable exhaust including a variable nozzle at said trailing edge.

27. The engine as recited in claim 26, wherein said adjustable intake is a louvered system, and said plurality of turning vanes have a variation of height.

28. The engine as recited in claim 27, wherein said pylon variable area flow system operates to adjust said bypass flow such that an angle of attack of said fan blades is maintained close to a design incidence at flight conditions other than said predefined flight condition.

29. The engine as recited in claim 28, wherein said flow passage is defined around a component duct within said at least one bifurcation that provides a communication path to said core nacelle from an aircraft wing for at least one of a wiring harness, fluid flow conduit, or other aircraft component.

* * * * *